United States Patent [19]
Niwa et al.

[11] Patent Number: 4,707,546
[45] Date of Patent: Nov. 17, 1987

[54] REACTIVE MONOAZO DYESTUFFS

[75] Inventors: Toshio Niwa; Kiyoshi Himeno; Toshio Hihara, all of Yokohama, Japan

[73] Assignee: Mitsubishi Chemical Industries Limited, Tokyo, Japan

[21] Appl. No.: 822,680

[22] Filed: Jan. 23, 1986

Related U.S. Application Data

[63] Continuation of Ser. No. 624,581, Jun. 26, 1984, abandoned.

[30] Foreign Application Priority Data

Jul. 12, 1983 [JP] Japan .................................. 58-126440

[51] Int. Cl.$^4$ ............................................. C09B 62/085
[52] U.S. Cl. ...................................... 534/635; 534/753
[58] Field of Search .................................. 534/636, 635

[56] References Cited

U.S. PATENT DOCUMENTS 3,658,783  4/1972  Knobloch et al. .................. 260/153
3,974,160  8/1976  Seiler et al. ......................... 260/249
4,097,475  6/1978  James ................................. 260/157

FOREIGN PATENT DOCUMENTS 0159255 12/1981 Japan ................................. 260/153

Primary Examiner—Charles F. Warren
Assistant Examiner—Carolyn S. Greason
Attorney, Agent, or Firm—Jordan B. Bierman

[57] ABSTRACT

A reactive monoazo dyestuff of the general formula [I]:

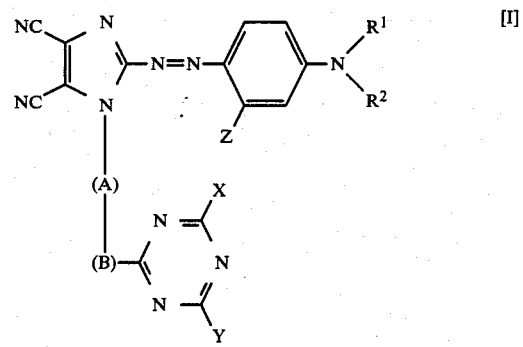

wherein $R^1$ and $R^2$ each represents substituted or unsubstituted alkyl, cyclohexyl, aralkyl or substituted or unsubstituted aryl, Z represents hydrogen, chlorine, methyl or acylamino, (A) represents substituted or unsubstituted alkylene, (B) represents oxygen or —NH—, X represents fluorine or chlorine, and Y represents —NR$^4$R$^5$ or —OR$^6$ wherein R$^4$, R$^5$ and R$^6$ each represents hydrogen, substituted or unsubstituted alkyl, alkenyl, cyclohexyl, aryl or aralkyl, or —NR$^4$R$^5$ represents a 5- or 6-membered nitrogen-containing heterocyclic ring formed by combining R$^4$ and R$^5$.

3 Claims, No Drawings

REACTIVE MONOAZO DYESTUFFS

This application is a continuation of application Ser. No. 624,581, filed 6/26/84, now abandoned.

BACKGROUND OF THE INVENTION

1. Field of the Invention

This invention relates to novel nonhydrophilic reactive monoazo dyestuffs. More specifically, it relates to reactive monoazo dyestuffs which dye polyester fibers, cellulose fibers or mixed fibers composed of polyester fibers and cellulose fibers in orange to red colors excellent in various fastness properties including light fastness.

2. Description of the Prior Art

Heretofore, there are known disperse mono- and bis-azo dyestuffs derived from 2-amino-4,5-dicyanoimidazoles and of the following general formula [A]:

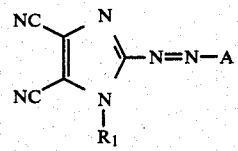

wherein $R_1$ is alkyl, substituted alkyl or aralkyl; and A is a residue of a coupling component selected from the group consisting of:

(i) a 5- or 6-membered heterocyclic ring having an amino, oxo or hydroxy substituent,
(ii) a substituted or unsubstituted napthol and
(iii) an aromatic amine having no substituent at the 4-position to the amino group and having at least one aliphatic or alicyclic substitutent attached to said amino nitrogen (Japanese Patent Publication No. 17848/1977), and water insoluble monoazo dyestuffs containing no sulfonic acid group and of the following general formula [B]:

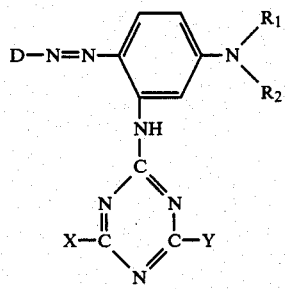

wherein D represents an aromatic carbocyclic ring or an aromatic heterocyclic ring; $R_1$ and $R_2$ may be the same or different and each represents appropriately substituted alkyl, preferably alkyl having 1-4 carbon atoms in the alkyl chain; X represents halogen, especially chlorine, optionally substituted alkoxy or a group

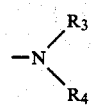

wherein $R_3$ and $R_4$ are hydrogen or the sme or different optionally substituted alkyl groups; Y represents appropriately substituted alkoxy or a group

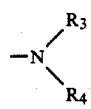

wherein $R_3$ and $R_4$ are as defined above (Japanese Patent Publication No. 36237/1970).

The dyestuffs [A] described in the aforesaid Japanese Patent Publication No. 17848/1977 are dicyanoimidazole type azo dyestuffs similar to the dyestuffs of this invention, but when cotton is dyed with said known dyestuff [A], since the dyestuff [A] has no reactive group, it does not easily dye cotton and further various fastness properties, such as wet fastness, e.g., washing fastness, water fastness etc., light fastness, abrasion fastness etc., are poor.

On the other hand, the dyestuffs [B] described in Japanese Patent Publication No. 36237/1970 are monoazo dyestuffs having a triazinyl group like the dyestuffs of this invention, but the triazinyl group in said known dyestuffs [B] is located in the coupling component in the dyestuff structure and no reactive group is present in the diazo component, whereas the dyestuffs of this invention have such a triazinyl group in the diazo component.

Thus, contrast to these known dyestuffs, the dyestuffs of this invention are reactive monoazo dyestuffs which are distinctly novel in the chemical structure.

SUMMARY OF THE INVENTION

Accordingly, this invention provides reactive monoazo dyestuffs of the general formula [I]:

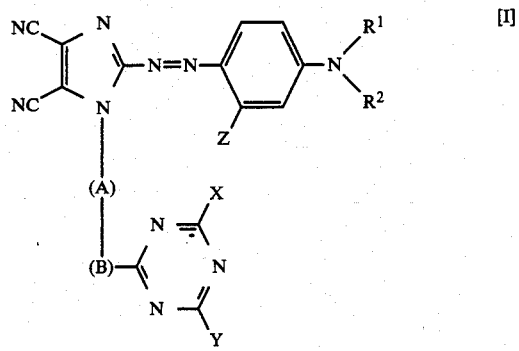

wherein $R^1$ and $R^2$ each represents substituted or unsubstituted alkyl, cyclohexyl, aralkyl or substituted or unsubstituted aryl, Z represents hydrogen, chlorine, methyl or acylamino, (A) represents substituted or unsubstituted alkylene, (B) represents oxygen or —NH—, X represents fluorine or chlorine, and Y represents —$NR^4R^5$ or —$OR^6$ wherein $R^4$, $R^5$ and $R^6$ each represents hydrogen, substituted or unsubstituted alkyl, alkenyl, cyclohexyl, aryl or aralkyl, or —$NR^4R^5$ represents a 5- or 6-membered nitrogen-containing heterocyclic ring formed by combining $R^4$ and $R^5$.

DETAILED DESCRIPTION OF THE INVENTION

The reactive monoazo dyestuffs of this invention are of the following general formula [I]:

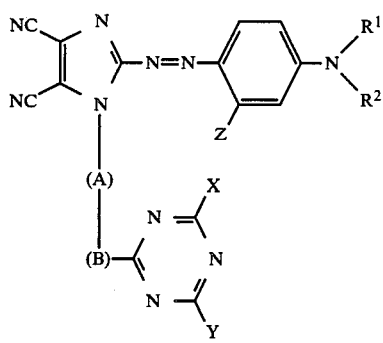

[I]

In the above formula [I], $R^1$ and $R^2$ each represents substituted or unsubstituted alkyl, cyclohexyl, aralkyl or substituted or unsubstituted aryl such as phenyl, chlorophenyl, methylphenyl etc.

Examples of the unsubstituted alkyl include methyl, ethyl, straight-chain or branched-chain propyl, butyl, pentyl, hexyl, heptyl, octyl etc., preferably $C_1$-$C_4$ alkyl.

Examples of the substituted alkyl include lower alkoxyalkyl such as methoxyethyl, ethoxyethyl, propoxyethyl, butoxyethyl etc.; lower alkoxyalkoxyalkyl such as methoxyethoxyethyl, ethoxyethoxyethyl, butoxyethoxyethyl etc.; alkenyloxyalkyl such as allyloxyethyl etc.; phenoxyalkyl such as phenoxyethyl etc.; optionally substituted aralkyloxyalkyl such as benzyloxyethyl, chlorobenzyloxyethyl etc.; hydroxyalkyl such as hydroxyethyl, hydroxypropyl, hydroxybutyl, hydroxyhexyl etc.; cyanoalkyl such as cyanomethyl, cyanoethyl etc.; substituted or unsubstituted acyloxyalkyl such as acetyloxyethyl, chloroacetyloxyethyl chloropropionyloxyethyl, benzoyloxyethyl etc.; lower alkoxycarbonyloxyalkyl such as methoxycarbonyloxyethyl, ethoxycarbonyloxyethyl, butoxycarbonyloxyethyl etc.; lower alkoxyalkoxycarbonyloxyalkyl such as methoxyethoxycarbonyloxyethyl, ethoxyethoxycarbonyloxyethyl etc.; carbamoylalkyl such as carbamoylmethyl, carbamoylethyl etc.; substituted or unsubstituted alkoxycarbonylalkyl such as methoxycarbonylmethyl, ethoxycarbonylmethyl, methoxyethoxycarbonylmethyl, benzyloxycarbonylmethyl etc.; substituted or unsubstituted aralkyl such as benzyl, phenethyl, chlorobenzyl etc.; allyloxycarbonylalkyl such as allyloxycarbonylethyl, allyloxycarbonylmethyl etc.; succinimidoalkyl such as succinimidoethyl etc.; phthalimidoalkyl such as phthalimidoethyl etc.; cyanoalkoxyalkyl such as cyanoethoxyethyl, cyanomethoxyethyl etc.; halogenated alkyl such as chloroethyl etc.; hydroxyalkoxyalkyl such as 2-hydroxy-3-methoxypropyl etc.; tetrahydrofurfuryl etc.

Of those, $C_1$-$C_4$ alkoxyalkyl is preferred, and in particular, $C_1$-$C_4$ alkoxyethyl is preferred.

In the above formula [I], Z represents hydrogen, chlorine, methyl or acrylamino, such as acetylamino, chloroacetylamino, benzoylamino, chlorobenzoylamino, methoxybenzoylamino, methylsulfonylamino, chloropropionylamino, ethoxycarbonylamino, ethylaminocarbonylamino etc., preferably acylamino, and particularly preferably benzoylamino.

In the above formula [I], (A) represents substituted or unsubstituted alkylene such as —$CH_2CH_2$—, —$CH_2CH_2CH_2$—,

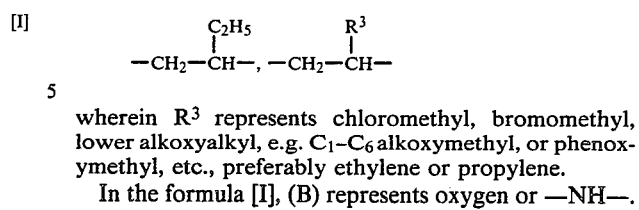

wherein $R^3$ represents chloromethyl, bromomethyl, lower alkoxyalkyl, e.g. $C_1$-$C_6$ alkoxymethyl, or phenoxymethyl, etc., preferably ethylene or propylene.

In the formula [I], (B) represents oxygen or —NH—.

Also in the formula [I], X represents fluorine or chlorine, preferably fluorine.

In the formula [I], Y represents —$NR^4R^5$ or —$OR^6$ wherein $R^4$, $R^5$ and $R^6$ each represents hydrogen; substituted or unsubstituted alkyl; alkenyl such as allyl, crotyl etc.; cyclohexyl; aryl such as phenyl etc.; or aralkyl such as benzyl, phenethyl etc.; or —$NR^4R^5$ represents a 5- or 6-membered nitrogen-containing heterocyclic ring formed by combining $R^4$ and $R^5$.

Examples of the substituted or unsubstituted alkyl are the same as those for the aforesaid $R^1$ and $R^2$.

Examples of the 5- or 6-membered nitrogen-containing heterocyclic ring include 1-pyrrolidinyl, 3-methyl-1-pyrrolidinyl, 2-hydroxyethyl-1-pyrrolidinyl, 2,5-dimethyl-1-pyrrolidinyl, 3-thiazolidinyl, 1-pyrrolyl, 1-pyrazolyl, 1-imidazolyl, morpholino, piperidino, 2,6-dimethylpiperidino, 1-piperadinyl, 4-methyl-1-piperadinyl etc.

For —$NR^4R^5$, dialkylamino having 4–12 carbon atoms in total such as N,N-dimethylamino, N,N-dibutylamino etc. is particularly desired.

The monoazo dyestuffs of the above general formula [I] may be prepared by reacting a monoazo compound of the following general formula [II]:

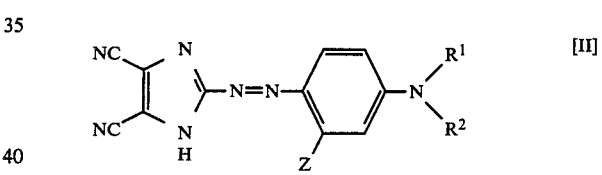

[II]

wherein $R^1$, $R^2$ and Z are as defined above with an alkylating agent of the following general formula [III]:

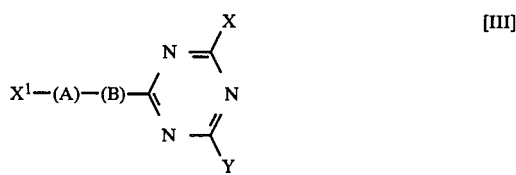

[III]

wherein $X^1$ represents chlorine, bromine or iodine, and (A), (B), X and Y are as defined above in a solvent such as N-methylpyrrolidone, methyl ethyl ketone, acetonitrile, toluene, chlorobenzene etc. in the presence of an acid binding agent such as triethylamine etc. at 50°-150° C. for 2-20 hours.

The alkylating agent of the general formula [III] may be prepared by dihalogenocyanulating an alcohol or amine of the following general formula [IV]:

[IV]

wherein $X^1$, (A) and (B) are defined above with a 2,4,6-trihalogenotriazine in a solvent such as N-methylpyrrolidone, acetone etc. in the presence of an acid binding agent such as triethylamine, sodium carbonate etc. at −5°–10° C. for 2–10 hours to prepare a compound of the following general formula [V]:

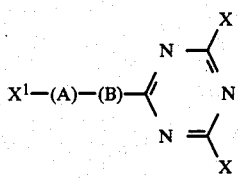

wherein $X^1$, X, (A) and (B) are as defined above, and thereafter reacting the thus obtained compound of the general formula [V] with an alcohol or amine of the following general formula [VI]:

YH          [VI]

wherein Y is as defined above in a solvent such as N-methylpyrrolidone, acetone etc. in the presence of an acid binding agent such as triethylamine, sodium carbonate etc. at −5°–10° C. for 2–10 hours.

Also, the reactive monoazo dyestuffs of the above general formula [I] may be prepared by the following alternative process.

That is, a monoazo dyestuff of the above general formula [II] is reacted with an alcohol or amine of the above general formula [IV] in a solvent such as N-methylpyrrolidone, methyl ethyl ketone, acetonitrile, toluene, chlorobenzene etc. in the presence of an acid binding agent such as triethylamine, sodium carbonate etc. at 50°–150° C. for 2–20 hours to prepare a monoazo dyestuff of the following general formula [VII]:

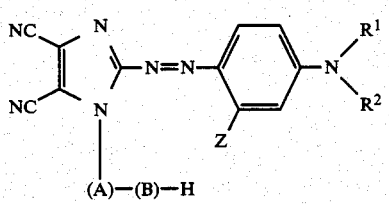

wherein $R^1$, $R^2$, Z, (A) and (B) are as defined above. Then, the hydrogen atom of the obtained monoazo dyestuff is dihalogenocyanulated in the same manner as above, and X in the thus obtained monoazo dyestuff of the following general formula [VIII]:

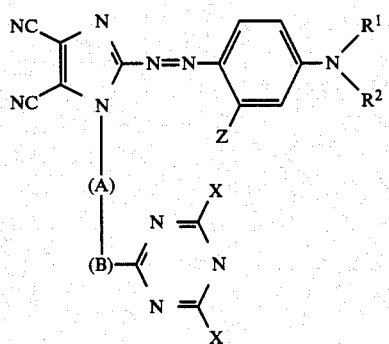

wherein $R^1$, $R^2$, Z, (A), (B) and X are as defined above is reacted with an alcohol or amine of the above general formula [VI] in a solvent such as N-methylpyrrolidone, acetone etc. in the presence of an acid binding agent such as triethylamine, sodium carbonate etc. at −5°–10° C. for 2–10 hours, thereby the reactive monoazo dyestuff of the above general formula [I] of this invention may be produced.

Examples of fibers which are dyed with the dyestuffs of the general formula [I] include natural fibers such as cotton, linen etc.; semi-synthetic fibers such as viscose rayon, copper ammonia rayon etc., partially aminated or partially acrylated modified cellulose fibers etc.; polyester fibers, cation-dyeable polyester fibers, anion-dyeable polyester fibers, polyamide fibers, wool, acrylic fibers, urethane fibers, diacetate fibers, triacetate fibers etc., and mixed yarns or mixed woven fabrics of the above-described fibers. Of those, the dyestuffs of this invention are particularly effective on the cellulose fibers, polyester fibers and mixed yarns or mixed woven fabrics of cellulose fibers and polyester fibers (those fibers being hereinafter referred to as the object fibers of this invention).

In dyeing, it is preferred that the dyestuff of the above general formula [I] be finely dispersed in a medium in a particle size of about 0.5–2μ. Suitable examples of the dispersing method include a method which comprises finely dispersing the dyestuff in water by a grinder such as a sand grinder, a mill etc. using a water-soluble dispersing agent such as a nonionic dispersing agent, e.g., a pluronic type surface active agent, or an anionic dispersing agent, e.g., sodium ligninsulfonate or a sodium salt of a naphthalene-sulfonic acid-formaldehyde condensate, etc.; a method which comprises finely dispersing the dyestuff in a solvent other than water, e.g., alcohols such as ethyl alcohol, isopropyl alcohol, polyethylene glycol etc., ketones such as acetone, methyl ethyl ketone etc., hydrocarbons such as n-hexane, toluene, xylene, mineral terpene etc., halogenated hydrocarbons such as tetrachloroethylene etc., esters such as ethyl acetate, butyl acetate etc., ethers such as dioxane, tetraethylene glycol dimethyl ether etc., or a mixed solvent thereof, using a sparingly soluble or water-insoluble dispersing agent such as a sulfosuccinic acid ester, or an addition product of nonylphenol etc. with low moles of ethylene oxide etc.; a method which comprises finely dispersing the dyestuff in a mixed system of water and a solvent freely compatible with water chosen from the above-described solvents, etc.

In the above-described dispersing step, a polymer compound soluble in the particular dispersing medium chosen, a surface active agent having some major function other than the dispersing action, etc. may also be safely added.

While the thus obtained fine dispersion of the dyestuff may be used as such as a padding bath in pad dyeing or as a printing color paste in print dyeing, it is general to use as a padding bath or a printing paste that obtained by further diluting the above-described fine dispersion of the dyestuff to a concentration determined according to the desired dyeing concentration with water or a mixed system of a solvent freely compatible with water and water, or as an O/W or W/O emulsion in which the oil layer is a petroleum hydrocarbon such as mineral terpene etc. or a halogenated hydrocarbon such as tetrachloroethylene etc.

In order to advantageously carry out dyeing in the preparation of a padding bath or a printing color paste, an alkali metal compound, an organic epoxy compound, an organic vinyl compound etc. may also be added as an acid-binding agent for the purpose of accelerating the reaction of cellulose fiber-swelling agents or the dyestuffs with cellulose fibers. As the alkali metal compound, it is possible to employ not only alkali metal carbonates but also alkali metal bicarbonates, alkali metal phosphates, alkali metal borates, alkali metal silicates, alkali metal hydroxides, alkali metal fatty acid salts such as alkali metal acetates etc., and alkali precursor compounds which generate an alkali when heated in the presence of water, such as sodium trichloroacetate, sodium acetoacetate etc. The amount of those alkali metal compounds used is generally satisfactorily such that the pH of the padding bath or printing color paste becomes 7.5–8.5.

Examples of the organic epoxy compound include ethylene glycol diglycidyl ether, polyethylene glycol diglycidyl ether having an average molecular weight of 150–400, etc. Examples of the organic vinyl compound include ethylene glycol diacrylate, diacrylate or dimethacrylate of polyethylene glycol having an average molecular weight of 150–400, etc. The amount of those compounds used is about 3–6% by weight based on the weight of the padding bath or printing color paste.

For the purpose of preventing dry migration in pad dyeing or for the purpose of controlling the color paste to an optimum viscosity in various print dyeing methods, thickeners, e.g., water-soluble polymer compounds such as sodium alginate etc. may also be added.

The mode of the preparation of the padding bath or printing color paste is not restricted to the methods described above. It is not always necessary that the cellulose fiber-swelling agent and the acid-binding agent be present in the padding bath or printing color paste, but they may be previously present in fibers.

Any compound may be used as the cellulose fiber-swelling agent so long as it has a boiling point of 150° C. or higher and has an effect to swell cellulose fibers. Examples thereof include ureas such as N,N,N',N'-tetramethylurea etc., polyhydric alcohols such as polyethylene glycol, polypropylene glycol etc., or derivatives thereof. Of those, derivatives of polyhydric alcohols such as polyethylene glycol, polypropylene glycol etc. having an average molecular weight of about 200–500 in which the hydroxyl groups at both terminals have been dimethylated or diacetylated so that they do not react with the reactive groups of the dyestuff are particularly preferred as the cellulose fiber-swelling agent.

The amount of the cellulose fiber-swelling agent used is suitably about 5–25% by weight, preferably about 8–15% by weight, based on the weight of the padding bath or printing color paste.

Dyeing of the above-described fibers with the dyestuffs of the above general formula [I] of this invention may be conducted in the conventional manner, for example, by impregnating or printing the object fiber of this invention with the thus prepared padding bath or printing color paste, then, after drying, heat-treating said fiber with hot air at 160°–220° C. or with superheated steam for 30 seconds to 10 minutes, or treating in a high pressure saturated steam at 120°–150° C. for 3–30 minutes, and finally washing with hot water containing a surface active agent, or washing in an O/W emulsion washing bath in which the oil layer is a halogenated hydrocarbon such as tetrachloroethylene etc., or washing by the conventional dry cleaning mode.

By the above-described method, a dyed product which has been clearly and uniformly dyed as has good light fastness and wet fastness may be obtained.

This invention is more particularly described in the following examples, but it will be understood that variations and modifications can be effected within the spirit and scope of this invention.

In the examples, all the parts are by weight.

EXAMPLE 1

A dyestuff dispersion was prepared from a dyestuff composition composed of 15 parts of a reactive monoazo dyestuff of the following structural formula:

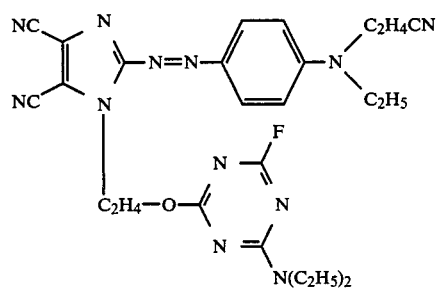

15 parts of a naphthalenesulfonic acid—formaldehyde condensate and 70 parts of water using a print shaker as a finely dispersing machine. Using this dyestuff dispersion, a printing color paste having the following composition:

| Dyestuff dispersion | 6.5 parts |
| --- | --- |
| 5% sodium alginate aqueous solution | 55 parts |
| Polyethylene glycol dimethyl ether, average molecular weight: 400 | 9 parts |
| Water | 29.5 parts |
| Total | 100 parts (pH 8.0) | was prepared. A polyester/cotton (mixing ratio:65/35) mixed spun cloth was print-dyed with the printing bath using a screen print dyeing machine. After provisionally drying at 80° C. for 3 minutes, the cloth was dry heated at 215° C. for 90 seconds to fix the paste. The cloth was then washed with water, and soaped with a detergent solution containing 2 g/l of a nonionic surface active agent ("Scourol #900", trademark, manufactured by Kao Soap Co., Ltd.) in a bath ratio of 1:30 at 80° C. for 20 minutes to obtain a yellowish red dyed product having excellent light fastness and wet fastness.

The dyestuff used in this example was prepared by dissolving 6.4 g of a compound of the following structural formula:

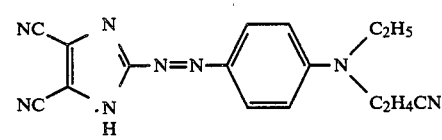

in 32 ml of acetonitrile, adding 3.0 g of triethylamine and 3.8 g of 2-fluoro-4-N,N-diethylamino-6-bromoethyloxytriazine of the following structural formula:

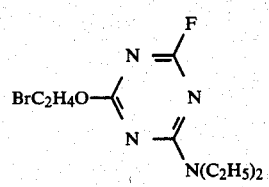

reacting them at 70°–75° C. for 15 hours, pouring the obtained reaction mixture into cold water, filtering off the formed precipitates, washing with water, and drying at room temperature to obtain 5.8 g (yield 80%) of a red powder of the dyestuff to the above structural formula. The maximum absorption wavelength λmax (acetone) was 510 nm.

The 2-fluoro-4-N,N-diethylamino-6-bromoethyloxytriazine was prepared by the following procedures.

4.9 g of 2,4,6-trifluorotriazine was dissolved in 20 ml of acetone with stirring, cooled to −5° to −3° C., 3.8 g of ethylene bromohydrin ($BrC_2H_4OH$) was added dropwise at the same temperature, then 3.1 g of triethylamine was added followed by 2.7 g of diethylamine at the same temperature, and the reaction was effected for an hour. After the reaction, the obtained reaction mixture was poured into 200 ml of cold water, and the lower oil layer was separated and dried to obtain 3.6 g (yield 95%) of 2-fluoro-4-N,N-diethylamino-6-bromoethyloxytriazine.

EXAMPLE 2

A dyestuff dispersion was prepared from a dyestuff composition composed of 15 parts of a reactive monoazo dyestuff of the following structural formula:

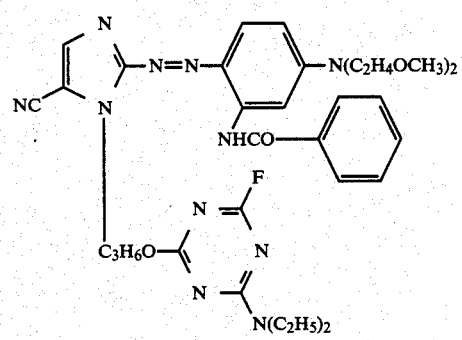

10 parts of a Pluronic type surface active agent ("Pluronic L 64", trademark, manufactured by Asahi Electrochemical Industries, Ltd.) and 75 parts of water using a sand grinder as a finely dispersing machine. A printing color paste having the following composition:

| | |
|---|---|
| Dyestuff dispersion | 7 parts |
| 5% sodium alginate aqueous solution | 55 parts |
| Diacetate of polypropylene glycol, average molecular weight: 300 | 10 parts |
| Polyethylene glycol diglycidyl ether, average molecular weight: 200 | 3 parts |
| Water | 25 parts |
| Total | 100 parts (pH 6.5) | was prepared. A mercerized cottom broad (40 counts) was print-dyed with the printing color paste using a screen print dyeing machine. After provisionally drying at 80° C. for 3 minutes, the dyed cotton broad was treated with superheated steam at 185° C. for 7 minutes.

Then, washing treatment was conducted following the procedures described in Example 1 to obtain a red dyed product having excellent light fastness and wet fastness.

The dyestuff used in this example was prepared as follows: 4.72 g of a compound of the following structural formula:

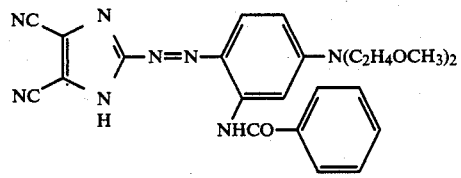

was dispersed in 15 ml of monochlorobenzene, then 2.1 g of bromopropanol ($BrC_3H_6OH$) and 1.5 g of triethylamine were added, reacted at 70°–75° C. for 15 hours, then, after cooling, 45 ml of methanol was added and stirred at 5° C. for 10 hours. The formed precipitates were filtered off and dried to obtain 4.3 g (yield 80%) of a compound of the following structural formula [IX]:

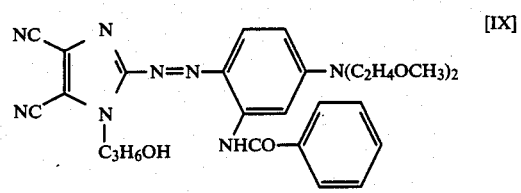

Thereafter, 5.31 g of the obtained compound of the structural formula [IX] was dissolved in 30 ml of N-methylpyrrolidone, cooled to −5° C., 1.8 g of 2,4,6-trifluorotriazine was added dropwise, maintained at the same temperature for an hour after the dropwise addition, then 1.3 g of triethylamine and 0.95 g of diethylamine were added dropwise at the same temperature, and stirred for an hour after the dropwise addition. The obtained reaction mixture was poured into water, and the formed precipitates were filtered off and dried to obtain 5.6 g (yield 80%) of the reactive monoazo dyestuff used in the present Example 2. The maximum absorption wavelength, λmax (acetone) of this dyestuff was 528 nm.

EXAMPLE 3

A dyestuff ink was prepared from a dyestuff composition composed of 10 parts of a reactive monoazo dyestuff of the following structural formula:

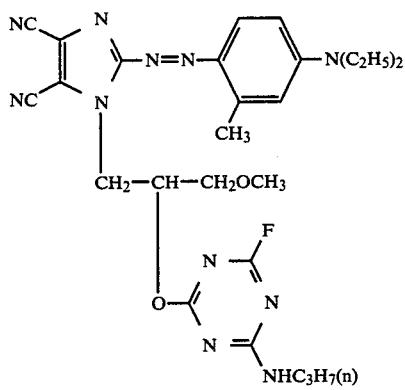

2 parts of polyethylene glycol nonyl phenyl ether (HLB 8.9) and 88 parts of diethylene glycol diacetate by pulverizing using a paint conditioner as a finely dispersing machine.

10 parts of this dyestuff ink and 55 parts of mineral terpene were mixed, then while this mixture was stirred using a homomixer (5,000-7,000 rpm) 35 parts of an aqueous solution having the following composition was gradually added thereto and stirred until homogeneous. Thus, a viscous O/W emulsion color paste was prepared.

| | |
|---|---|
| Water | 31 parts |
| Repitol G (trademark, manufactured by Daiichi Kogyo Seiyaku Co., Ltd. special nonionic surface active agent) | 3.8 parts |
| Sodium trichloroacetate | 0.1 part |
| Total | 34.9 parts |

Then, a polyester/cotton (mixing ratio:65/35) mixed spun cloth was print-dyed with the color paste using a screen print dyeing machine, dried at 100° C. for 2 minutes, and then treated with superheated steam at 175° C. for 7 minutes. The dyed cloth was washed in a hot tetrachloroethylene bath containing a small amount of water and dried to obtain a red dyed product having excellent light fastness and wet fastness without any stain on the white ground.

The dyestuff used in this example was synthesized according to the procedures described in Example 1.

The maximum absorption wavelength, λmax (acetone) of this product was 530 nm.

EXAMPLE 4

A dyestuff dispersion was prepared from a dyestuff composition composed of 16 parts of a monoazo dyestuff of the following structural formula:

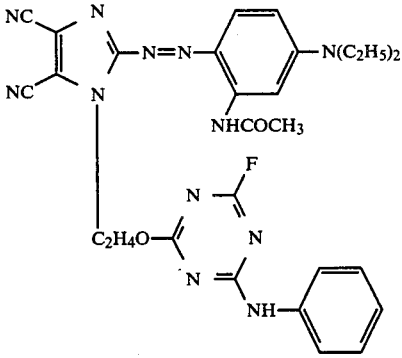

7 parts of polyoxyethylene glycol nonyl phenyl ether (HLB 13.3), 3 parts of a naphthalenesulfonic acid—formaldehyde condensate and 74 parts of water by finely dispersing using a sand grinder.

Using this dyestuff dispersion, a padding bath having the following composition was prepared.

| | |
|---|---|
| Dyestuff dispersion | 6 parts |
| Tetraethylene glycol dimethyl ether | 15 parts |
| Water | 79 parts |
| Total | 100 parts (pH 8.0) |

A polyester/cotton (mixing ratio:65/35) mixed spun cloth was impregnated with the padding bath, squeezed to a squeezing rate of 45%, then dried at 100° C. for 2 minutes and dry squeezed at 200° C. for one minute to fix. This cloth was washed with a hot ethanol bath to obtain a red dyed product having excellent light fastness and wet fastness.

The dyestuff used in this example was synthesized according to the procedures described in Example 1.

The maximum absorption wavelength, λmax (acetone) of this product was 503 nm.

EXAMPLE 5

Print dyeing was conducted in the same manner as in Example 1 except that the fiber was replaced by a nylon/rayon (mixing ratio:50/50) mixed spun cloth and the dry heating temperature was changed to 185° C., to obtain a red dyed product having good wet fastness and light fastness.

EXAMPLE 6

A dyestuff dispersion was prepared from a dyestuff composition composed of 16 parts of a reactive monoazo dyestuff of the following structural formula:

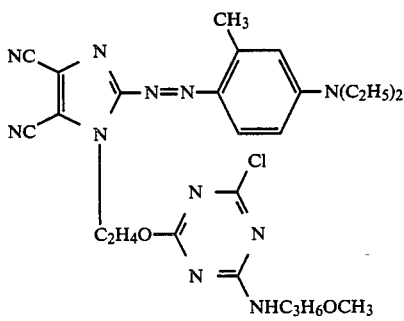

7 parts of polyoxyethylene glycol nonyl phenyl ether (HLB 13.3), 3 parts of a naphthalenesulfonic acid—formaldehyde condensate and 74 parts of water by finely dispersing using a sand grinder.

Using this dyestuff dispersion, a printing paste having the following composition was prepared.

|  |  |
|---|---|
| Dyestuff dispersion | 30 parts |
| Cellucol PBL 600*[1] | 24 parts |
| Kiprogum P-20N*[2] | 45.5 parts |
| Tartaric acid | 1.5 parts |
| MS Powder*[3] | 10.2 parts |
| Meiprintor Y-75*[4] | 30 parts |
| Water | 858.8 parts |
| Total | 1,000 parts |

Notes
*[1] Trademark, manufactured by Adachi Noriryo Co., Ltd.
*[2] Trademark, manufactured by Nichiden Chemical Co., Ltd.
*[3] Trademark, manufactured by Meisei Chemical Co., Ltd.
*[4] Trademark, manufactured by Meisei Chemical Co., Ltd.

A polyester cloth was print-dyed with the color paste, then provisionally dried at 100° C. for 2 minutes, and treated with superheated steam at 185° C. for 7 minutes to fix the dye-stuff followed by reducing washing in the conventional manner to obtain a bluish red dyed product.

EXAMPLE 7

A dyestuff dispersion was prepared from a dyestuff composition composed of 16 parts of a reactive monoazo dyestuff of the following structural formula:

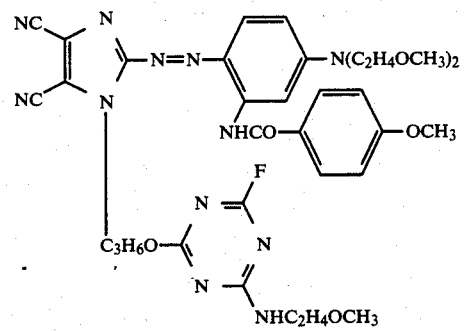

7 parts of polyoxyethylene glycol nonyl phenyl ether (HLB 13.3), 3 parts of a naphthalenesulfonic acid—formaldehyde condensate and 74 parts of water by finely dispersing using a sand grinder. Using this dyestuff dispersion, a printing color paste having the following composition:

|  |  |
|---|---|
| Dyestuff dispersion | 7 parts |
| 5% sodium alginate aqueous solution | 55 parts |
| Polyethylene glycol dimethyl ether, average molecular weight: 400 | 9 parts |
| Water | 29 parts |
| Total | 100 parts (pH 8.0) | was prepared. A cotton broad cloth was print-dyed with the printing paste, then provisionally dried at 80° C., and dry heated at 215° C. for 90 seconds to fix the dyestuff. This was then washed with water, and soaped using a washing solution containing 2 g/l of a nonionic surface active agent ("Scourol #900", trademark, manufactured by Kao Soap Co., Ltd.) in a bath ratio of 1:30 at 80° C. for 20 minutes to obtain a red dyed product having excellent light fastness and wet fastness.

EXAMPLE 8

Print dyeing was conducted using the reactive monoazo dyestuffs set forth in Table 1 respectively in the same manner as described in Example 1. The light fastness and wet fastness of each obtained dyed product were both good.

The hue of each dyed product and the maximum absorption wavelength, λmax (acetone) of each dyestuff are shown in Table 1.

TABLE 1

General Formula:

Structure showing a benzene ring with -N(R¹)(R²) group, substituent Z, connected via -N=N- to a pyrimidine ring bearing NC groups, with -(A)-(B)- linkage to a second pyrimidine bearing X and Y substituents.

| # | R¹ | R² | Z | X | Y | A | B | Hue of Dyed Cloth | λmax (acetone nm) |
|---|---|---|---|---|---|---|---|---|---|
| 1 | $-C_2H_5$ | $-C_2H_4COOCH_3$ | $-H$ | $-F$ | $-N(C_2H_5)_2$ | $-C_2H_4-$ | $-NH-$ | Yellowish red | 507 |
| 2 | $-C_2H_4OCOCH_3$ | $-C_2H_4OCOCH_3$ | " | " | " | " | " | Yellowish red | 498 |
| 3 | $-C_2H_4OCOOC_2H_5$ | $-C_2H_4OCOOC_2H_5$ | " | " | " | " | " | Yellowish red | 496 |
| 4 | $-C_2H_4OCO-C_6H_5$ | $-C_2H_4OCO-C_6H_5$ | " | " | " | " | " | Yellowish red | 495 |
| 5 | $-C_2H_5$ | $-C_2H_4COOC_2H_4O-C_6H_5$ | $-H$ | $-Cl$ | " | $-CH_2-CH(CH_3)-$ | $-O-$ | Yellowish red | 502 |
| 6 | $-C_2H_5$ | $-CH_2COOCH_2-C_6H_5$ | $-CH_3$ | $-Cl$ | $-N(C_2H_5)_2$ | $-CH_2-CH(C_2H_5)-$ | $-O-$ | Yellowish red | 497 |
| 7 | $-C_4H_9$ | $-C_3H_6COOC_2H_5$ | " | $-F$ | " | " | " | Red | 525 |
| 8 | $-C_2H_4CN$ | $-C_2H_5$ | " | " | " | " | " | " | 516 |
| 9 | $-CH_2-C_6H_5$ | $-CH_2-C_6H_5$ | " | " | " | " | " | " | 519 |
| 10 | $-CH_2-CH=CH_2$ | $-C_2H_4CN$ | " | " | $-NHC_3H_7(n)$ | $-C_2H_4-$ | " | " | 512 |
| 11 | $-C_8H_{17}(n)$ | $-C_2H_4OAc$ | " | " | " | " | " | " | 516 |

TABLE 1-continued

General Formula:

| | R[1] | R[2] | Z | X | Y | A | B | Hue of Dyed Cloth | λmax (acetone nm) |
|---|---|---|---|---|---|---|---|---|---|
| 12 | —C₂H₅ | —CH₂—(tetrahydrofuran-2-yl) | " | " | " | " | " | " | 519 |
| 13 | —C₂H₄OCH₃ | —C₂H₄OCH₃ | " | " | —N(C₄H₉(n))₂ | " | " | " | 515 |
| 14 | —C₂H₅ | —CH₂CH=CH₂ | —CH₃ | —F | —N(C₄H₉(n))₂ | —C₂H₄— | —O— | " | 524 |
| 15 | —C₂H₅ | —C₂H₄Cl | " | —Cl | " | " | " | " | 522 |
| 16 | —(cyclohexyl) | —C₂H₅ | " | " | " | " | " | " | 528 |
| 17 | —H | —C₂H₄—(phenyl) | " | " | —N(piperidinyl) | " | " | " | 515 |
| 18 | —(phenyl) | —C₂H₄O—(phenyl) | " | " | —OCH₃ | " | —NH— | " | 514 |
| 19 | —C₂H₄OC₄H₉(n) | —C₂H₄OC₄H₉(n) | —NHCO—(phenyl) | —F | —N(morpholinyl) | " | —O— | " | 523 |

TABLE 1-continued

General Formula:

Structure shown: A benzene ring with -N(R¹)(R²) at one position, -N=N- linking to an imidazole ring with two -CN (NC) groups and substituent -(A)-(B)- group; ortho to the azo linkage on the benzene is Z; the imidazole-linked triazine ring bears X, Y, and is connected via (A)-(B) bridge.

| No. | R¹ | R² | Z | X | Y | A | B | Hue of Dyed Cloth | λmax (acetone nm) |
|---|---|---|---|---|---|---|---|---|---|
| 20 | $-C_2H_5$ | $-C_2H_5$ | " | " | $-NHCH_2-C_6H_5$ | $-C_3H_6-$ |  | " | 528 |
| 21 | $-C_2H_5$ | $-C_2H_4OC_2H_4OCH_3$ | " | " | $-N(CH_3)_2$ | " |  | " | 525 |
| 22 | $-C_2H_4OCH_3$ | $-C_2H_4OCOCH_3$ | " | $-Cl$ | $-N(C_6H_{13}(n))_2$ | " | $-O-$ | " | 520 |
| 23 | $-C_2H_5$ | $-C_2H_4CN$ | " | $-F$ | " | " | " | " | 515 |
| 24 | $-C_2H_5$ | $-CH_2COOCH_3$ | " | " | $-NHC_2H_4CN$ | " | " | " | 513 |
| 25 | $-CH_2-C_6H_5$ | $-C_6H_{13}(n)$ | " | " | $-NH-C_6H_5$ | " |  | " | 526 |
| 26 | $-C_2H_5$ | $-C_2H_5$ | " | " | " | $-C_2H_4-$ | $-NH-$ | " | 528 |
| 27 | $-C_2H_4OCH_3$ | $-C_2H_4OCH_3$ | " | " | " | " | " | " | 523 |
| 28 | $-C_2H_5$ | $-C_2H_4$ | $-NHCOCH_3$ | " | $-N(C_2H_5)_2$ | $\begin{array}{c}CH_2OC_4H_9(n)\\|\\-CH_2-CH-\end{array}$ | $-O-$ | " | 530 |
| 29 | $-C_2H_4OCH_3$ | $-C_2H_4OCH_3$ | " | " | " | " | " | " | 526 |
| 30 | $-C_2H_5$ | $-C_2H_4COOCH_3$ | " | " | " | " | " | " | 525 |
| 31 | $-C_2H_5$ | $-C_2H_4CN$ | $-NHCOC_2H_4Cl$ | $-Cl$ | $-NHC_3H_7(i)$ | $-C_2H_4-$ | $-NH-$ | " | 521 |
| 37 | $-C_2H_5$ | $-C_2H_5$ | $-NHCOCH_2Cl$ | $-F$ | " | $-C_2H_5-$ | " | " | 529 |
| 38 | $-C_2H_5$ | $-C_2H_5$ | " | " | " | " | $-NH-$ | " | 528 |
| 39 | $-C_2H_4OCH_3$ | $-C_2H_4OCH_3$ | " | " | " | " | $-O-$ | " | 523 |

TABLE 1-continued

General Formula:

[Structure: dicyanoimidazole-azo dye with R¹R²N-phenyl(Z)-N=N-C(A)=(B)-ring bearing X,Y substituents]

| | R¹ | R² | Z | X | Y | A | B | Hue of Dyed Cloth | λmax (acetone) nm |
|---|---|---|---|---|---|---|---|---|---|
| 40 | —C₂H₄OCOOC₂H₅ | —C₂H₄OCOOC₂H₅ | —Cl | " | —NHCH₂—CH(C₂H₅)—C₄H₉(n) | | " | Orange | 487 |
| 41 | —C₂H₄OCO—C₆H₅ | —C₂H₄OCO—C₆H₅ | " | —Cl | " | | " | " | 486 |
| 42 | —C₂H₅ | —C₂H₅ | " | " | " | —CH₂—CH(CH₂OCH₃)— | " | Yellowish red | 498 |
| 43 | —C₂H₅ | —C₂H₅ | " | —F | " | | " | Red | 525 |
| 44 | —C₂H₅ | —C₂H₅ | —NHCO—C₆H₄—Cl(p) | " | —OCH₃ | | " | " | 532 |
| 45 | —C₂H₄OCH₃ | —C₂H₄OCH₃ | —NHCO—C₆H₄—OCH₃(p) | " | " | —CH₂—CH(CH₂—O—C₆H₅)— | " | " | 527 |

What is claimed is:

1. A reactive monoazo dyestuff of the following formula

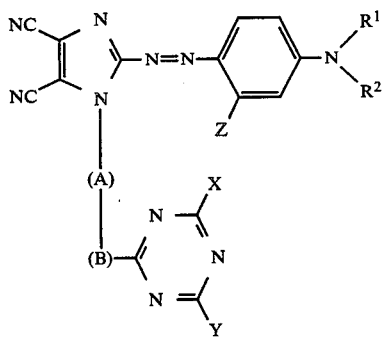

wherein each of $R^1$ and $R^2$ represents lower alkyl, lower alkoxyalkyl or tetrahydrofurfurylalkyl, Z represents methyl or acylamino, (A) represents $-C_2H_4-$ or $-C_3H_6-$, (B) represents oxygen, X represents fluorine and Y represents $-NR^4R^5$ wherein each of $R^4$ and $R^5$ represents hydrogen, substituted or unsubstituted lower alkyl or aralkyl.

2. The reactive monoazo dyestuff according to claim 1 wherein each of $R^1$ and $R^2$ represents $C_1$-$C_4$ alkyl or $C_1$-$C_4$ alkoxyethyl, Z represents

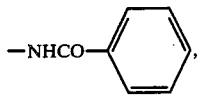

and Y represents diethylamino or dibutylamino.

3. The reactive monoazo dyestuff according to claim 1 wherein $R^1$ and $R^2$ each represent lower alkyl and Z represents acyl amino.

* * * * *